Patented Sept. 2, 1947

2,426,792

UNITED STATES PATENT OFFICE 2,426,792

PROCESS FOR PREPARING A MERCURY OXIDE CATALYST

Leroy Frank Salisbury, Wilmington, Del., assignor to E. I. du Pont de Nemours & Company, Wilmington, Del., a corporation of Delaware No Drawing. Application October 29, 1943, Serial No. 508,243

2 Claims. (Cl. 252—253)

This invention relates to novel catalyst compositions useful in synthesizing organic compounds, and to novel methods for preparing said catalytic compositions and compounds.

More particularly, the invention relates to new catalyst compositions advantageously useful in promoting the conversion of hydrocarbons containing an acetylenic unsaturation to the corresponding substituted or unsubstituted vinyl fluoride, e. g., vinyl fluoride, fluoroprene (fluoro-2-butadiene-1,3), said catalyst comprising charcoal-supported mercury oxide at least partially combined chemically with an oxide of nitrogen.

Many catalysts consisting of catalytically-active metals or their oxides, either alone or supported on suitable substrates, are already known. Catalysts containing mercury oxide, prepared by impregnating charcoal with a suspension of mercury oxide or by formation of the oxide in situ on the charcoal by metathesis or decomposition of certain mercury salts other than nitrate, are also known and have been specifically suggested as useful in the manufacture of acetaldehyde from acetylene. When employed in vinyl fluoride syntheses, however, these prior types of catalysts prove very unsatisfactory because they are undesirably low in efficiency, activity and durability.

I have discovered that the disadvantages inherent in prior catalysts, especially those contemplated for use in vinyl fluoride syntheses, can be readily overcome. A salient object of my invention, therefore, is to provide a new and improved type of catalytic composition outstandingly useful in the synthesis of unsaturated fluorohydrocarbons, especially vinyl fluoride, fluoroprene, and the like. A particular object of the invention is to provide a novel, improved, highly active, durable type of catalytic composition comprising mercury oxide at least partially combined chemically with an oxide of nitrogen supported on charcoal. A further object is to provide a catalyst composition especially useful and efficient in the condensation of an acetylene with hydrogen fluoride. Other objects and advantages of the invention will be apparent from the ensuing description.

These and other objects are attainable in this invention which comprises a novel catalytic composition containing mercury oxide at least partially combined chemically with an oxide of nitrogen, supported on a carbon-containing carrier.

In a more specific and preferred embodiment, the invention comprises a catalytic composition consisting of mercury oxide at least partially combined chemically with an oxide of nitrogen, preferably in the form of basic mercury nitrate, supported on charcoal.

In one practical adaptation of the invention, granular charcoal is suitably impregnated with a mercury nitrate solution, following which the impregnated charcoal is roasted in a suitable reaction vessel or chamber at temperatures ranging from about 95° C. to 200° C. The roasting operation is conducted under conditions providing for changing the atmosphere about the heated mass about every five minutes, this being conveniently effected by passage of a dry, gaseous medium such as air through the reaction mass. Roasting is continued until either free mercury appears in the colder portions of the exit end of the reaction zone or retort, or until the moisture content of the mass under treatment is below about 2%, and preferably below 1%. The charcoal mass is then cooled rapidly by removal from the heating zone.

Alternatively, the roasting operation may be conducted under a reduced or diminished pressure of from about 1 to 30 mm. of mercury, in which event circulation of the dry air or other gas through the retort is dispensed with. At the conclusion of a roasting which is marked by the appearance of free mercury or by a vigorous evolution of gases, or both, or by a decrease in the moisture content of the mass to below 2%, the catalyst is partially cooled by removal from the heating zone and is then blown with dry nitrogen or air.

The resulting catalytic composition will be found to contain from about 20-100% of the mercury originally present in the salt, together with varying amounts of chemically-combined nitrogen, and after preparation is conveniently stored out of contact with moisture until required for use. Because of its more active and durable nature, the resulting catalyst will be found to be especially efficient in the condensation of an acetylene with hydrogen fluoride, e. g., in the synthesis of vinyl fluoride from acetylene and hydrogen fluoride and in the synthesis of fluoroprene from monovinylacetylene and hydrogen fluoride.

To a clearer understanding of the invention, the following specific examples are given, but the invention is obviously not restricted to these examples:

Example I

Two and one-half liters of a moist charcoal is impregnated with mercuric nitrate equal to 50 grams of mercury oxide per liter and charged into a glass reaction vessel provided with a pressure indicator. The vessel and its contents are heated in an oven maintained at 170° C. under 10 to 30 mm. of mercury pressure. After about 2 hours, a rapid evolution of gas occurs, as indicated by a rise in the internal pressure in the vessel. Gas evolution quickly subsides and free mercury is simultaneously detected in the colder portions of the tube. At this point the glass vessel is removed from the oven to permit rapid cooling and the vacuum is released by admitting nitrogen. The finished catalyst contains 36.5 grams of total mercury per liter.

Example II

Two and one-half liters of moist charcoal is impregnated with mercuric nitrate equal to 100 grams of mercuric oxide per liter and roasted in an oven at 200° C. at atmospheric pressure with a stream of dry air (600 cc. per minute) passing through the charcoal. As soon as free mercury appears in the exit end of the reaction vessel, heating is discontinued and the vessel is removed from the oven. The finished catalyst contains 34.7 grams of total mercury and 1.04 grams of nitrogen per liter or an atomic ratio of mercury to nitrogen of 2.3.

Example III

Two and one-half liters of moist charcoal is impregnated with mercuric nitrate equal to 100 grams of mercuric oxide per liter and ferrous nitrate equal to 4 grams of ferric oxide per liter and roasted as indicated in Example I, except that the temperature of roasting is 200° C. The finished catalyst contains 53 grams of total mercury per liter.

Example IV

One hundred eight grams of mercuric oxide is mixed with 32 cc. of 70% nitric acid and the mixture is thoroughly agitated and subjected to grinding. The white product which is obtained is suspended in water and mixed with 1500 cc. of charcoal. The mixture is dried at 125° C. under a slow stream of air (about 500 cc. per minute) until the moisture content of the mass is below 2% and preferably below 1%.

Example V

Five liters of charcoal is impregnated with mercuric nitrate equivalent to 100 grams of mercuric oxide per liter, the volume of the mercuric nitrate solution being just sufficient to wet the charcoal. The impregnated charcoal is then dried for 20 hours at 90° to 100° C. and atmospheric pressure, for an additional 20 hours at 90° to 100° C. and 10 to 30 mm. of mercury pressure, and finally for 20 hours at 95° to 100° C. and 1 to 3 mm. of mercury pressure. During this period oxides of nitrogen are evolved. Analysis shows that all of the mercury originally present is retained in the dried catalyst and that the atomic ratio of nitrogen to mercury is 0.55.

By way of contrast, catalysts prepared by impregnating charcoal with a water suspension of mercuric oxide followed by drying, or by impregnating charcoal first with mercuric chloride and then with sodium hydroxide, followed by thorough washing and drying, when tested under conditions similar to those described above, give incomplete conversion of the acetylene to vinyl fluoride and are rapidly deactivated.

As a carrier or support for my novel catalyst, charcoal derived from the incomplete combustion of animal or vegetable matter, e. g., wood, bones, nut shells, cocoanut, etc., is preferred for use. The active charcoal may be in granular or finely-divided condition. When used in a finely-divided state, a settling chamber must be attached to the furnace or heating element in order to permit the charcoal dust to settle out of the gas stream during preparation. Another excellent support comprises magnesium fluoride, the use of which will be found to advantageously promote the activity and prolong the effectiveness of the catalyst and reduce mercury loss during the roasting operation.

Although basic mercury nitrate comprises a preferred type of mercury salt for use in my invention, other forms of mercury nitrate salts, as well as mixtures thereof, can also be used. Thus, both the mercuric and mercurous nitrate salts are usefully employable herein, included among which may be mentioned mercuric nitrate ($Hg(NO_3)_2$); the various basic mercuric nitrates, such as $2Hg(OH).NO_3.H_2O$; $Hg(NO_3)_2.2HgO.H_2O$; and mercurous nitrate, $HgNO_3.2H_2O$, etc.

Similarly, though temperatures ranging from 95°–200° C. have been mentioned as utilizable in the invention, the roasting temperature to which the impregnated carbon mass may be subjected during preparation of the catalyst may range to as low as about 90° C. When temperatures above 200° C. are employed in the roasting step, decomposition of the mercury compound will proceed so rapidly that extensive, undesired losses occur through formation of free mercury. Hence, the use of temperatures above 200° C. is to be avoided where optimum results are desired.

The roasting operation may be conducted at either atmospheric, superatmospheric or subatmospheric pressures. For reasons of economy, I prefer to operate at atmospheric pressure in which instance a stream of dry air passing through the charcoal is used to remove moisture and the gases given off during the roasting. This is also desirable when superatmospheric pressures are employed, but is unnecessary when subatmospheric pressures prevail, since any vapors evolved are removed by the vacuum system.

In place of the iron nitrate mentioned in Example III, other metallic nitrates may be used in conjunction with the mercury compound provided they decompose at 200° C. or below. Suitable examples of such nitrates are those of bismuth, nickel, cobalt, cerium, chromium, copper, beryllium, tellurium and thallium, as well as the nitrates of the rare earth metals.

I claim as my invention:

1. A process for preparing an improved durable catalytic composition containing mercury oxide at least partially combined chemically with an oxide of nitrogen, which comprises impregnating charcoal with a mercury nitrate solution, roasting the resulting product at temperatures ranging from about 90–200° C. until free mercury appears in the exit of the reaction zone where said roasting operation is conducted, and then cooling and recovering the resulting catalytic composition.

2. A process for preparing an improved durable catalytic composition containing mercury oxide at least partially combined chemically with an oxide of nitrogen, comprising impregnating moist charcoal with a solution of mercuric nitrate, roasting the resulting product at atmospheric pressure and a temperature of about 200° C. until free mercury appears in the exit of the reaction zone where said roasting operation is conducted, during said roasting passing a stream of dry air through the reaction mass, and then cooling and recovering the resulting catalytic composition.

LEROY FRANK SALISBURY.

REFERENCES CITED

The following references are of record in the file of this patent:

UNITED STATES PATENTS

| Number | Name | Date |
|---|---|---|
| 1,519,470 | Wilson et al. | Dec. 16, 1924 |
| 1,355,299 | Bender | Oct. 12, 1920 |
| 2,192,143 | Midgeley et al. | Feb. 27, 1940 |
| 1,939,647 | Arnold et al. | Dec. 19, 1933 |
| 2,243,404 | Voorhies | May 17, 1941 |

OTHER REFERENCES

Berkman, Catalysis, published by Reinhold Publishing Corp., New York, 1940, pp. 694, 733, 787, 928 and 947.

Mellor, Comprehensive Treatise on Inorganic and Theoretical Chemistry, vol. 4, page 772.